(12) United States Patent
Lu

(10) Patent No.: US 6,289,475 B1
(45) Date of Patent: Sep. 11, 2001

(54) METHOD OF RETRIEVING STORAGE CAPACITY OF DAMAGED SECTOR

(75) Inventor: Max Lu, Hsinchu Hsien (TW)

(73) Assignee: Windbond Electronics Corp., Hsinchu (TW)

( * ) Notice: Subject to any disclaimer, the term of this patent is extended or adjusted under 35 U.S.C. 154(b) by 0 days.

(21) Appl. No.: 09/286,020

(22) Filed: Apr. 5, 1999

(30) Foreign Application Priority Data

Jan. 30, 1999 (TW) .................................................. 88101440

(51) Int. Cl.[7] ...................................................... G06F 11/00
(52) U.S. Cl. ............................................ 714/710; 360/48
(58) Field of Search ..................................... 714/710, 718, 714/701; 360/48

(56) References Cited

U.S. PATENT DOCUMENTS 4,656,532 * 4/1987 Greenberg et al. .................... 360/48
4,814,903 * 3/1989 Kulalowski et al. .................. 360/48

* cited by examiner

Primary Examiner—Phung M. Chung
(74) Attorney, Agent, or Firm—Jiawei Huang; J. C. Patents

(57) ABSTRACT

A method of retrieving storage capacity of damaged sector. A storage medium comprising a storage capacity part and a reserved capacity part is provided. The storage capacity part comprises multiple primary sectors, while the reserved capacity part comprises multiple secondary sectors. The storage medium is scanned to find and record a damaged sector in the storage capacity part. An identity field of the damaged sector is overwritten by an null identity field of one of the secondary sectors. The identity field of the damaged sector is written into the secondary sector.

9 Claims, 2 Drawing Sheets

METHOD OF RETRIEVING STORAGE CAPACITY OF DAMAGED SECTOR

CROSS-REFERENCE TO RELATED APPLICATION

This application claims the priority benefit of Taiwan application Ser. No. 88101440, filed Jan. 30, 1999, the full disclosure of which is incorporated herein by reference.

BACKGROUND OF THE INVENTION

1. Field of the Invention

The invention relates to a method of retrieving storage capacity of damaged or defect sectors by utilizing reserved capacity. More particularly, the invention relates to a special formatting program, which reformats the storage medium and employs the reserved capacity of the storage medium to replace the capacity occupied by the damaged sectors, so as to retrieve the capacity of the storage medium.

2. Description of the Related Art

As the information technology has been very well developed in the modern society, the application of computers involves versatile fields such as multi-medium, network, data storage, and information transmission. Computers are now basic equipment that almost all kinds of business or professions obligate. Moreover, it is now so common that almost every family owns a computer.

The storage medium used to store information data in a computer comprises a conventional disk, a compact disk (CD), or other media. A conventional floppy disk is to be described as follows.

In a conventional storage medium, a portion of sectors is not to be access under a normal operation. The storage capacity occupied by the portion of sectors is called a reserved capacity of the storage medium. Taking a high density floppy disk as an example, the usable storage capacity is supposed to be 1.44 Mbytes/disk. However, according to a test result under the DOS/Windows environment, at least a usable capacity of about 320 Kbyte is reserved from being used.

In addition, while performing a normal formatting operation, a damaged sector in the disk is marked with a flag to avoid the disk format data in this damaged sector to be accessed any more. As a consequence, the available storage capacity is reduced according to the marked disk format data of the damaged sectors.

SUMMARY OF THE INVENTION

The invention provides a method of retrieving a storage capacity occupied by a damaged sector. The storage medium is scanned to record an identity tag of the damage sector. The identity tag of the damage sector is overwritten with a null identity tag of a reserved capacity sector. The null identity tag of the reserved capacity sector is then overwritten with the identity tag of the damaged sector.

Typically, a storage medium comprises a storage capacity part and a reserved capacity part. The storage capacity part comprises multiple primary sectors, and the reserved capacity part comprises multiple secondary sectors. Each of the secondary sectors in the reserved capacity part comprises an empty identity (ID) field. Thus, by overwriting the identity tag of a damaged sector as a reserved sector, and overwriting the identity tag of a reserved sector as the damaged sector, the access sectors are not occupied. That is, more capacity of the storage medium is released to allow more data or information to be accessed.

Another method for retrieving storage capacity occupied by a damaged sector by using the reserved capacity of the storage medium is also provided by the invention. As mentioned above, the storage medium comprises a storage capacity part and a reserved capacity part. The storage capacity part comprises multiple primary sectors, each of which further comprises an identity field. The identity fields of the primary sectors in the storage capacity part are arranged in a sequential order according to the sequence of the primary sectors. The reserved capacity comprises multiple secondary sectors, each of which has an null identity field. The primary sectors are scanned to record the identity field of any damaged primary sector. A null identity field is written into the identity field of the damaged sector. The identity fields of the primary sectors are rearrange with the identity field of the damaged sector skipped to obtain a new sequential order.

The invention employs a special formatting program to replace a capacity occupied by a damaged sector with a reserved capacity. Thus, the storage capacity is retrieved and the capacity of the storage medium is not reduced even when some of the sectors are damaged.

It is to be understood that both the foregoing general description and the following detailed description are exemplary and explanatory only and are not restrictive of the invention, as claimed.

DESCRIPTION OF THE PREFERRED EMBODIMENTS

Figure 1:
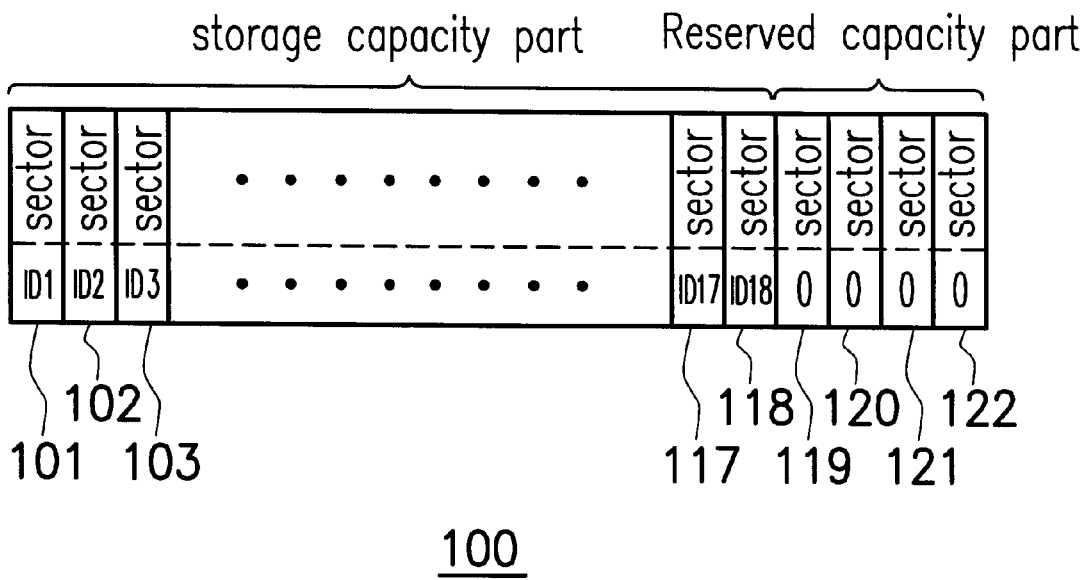
FIG. 1 is a schematic drawing of a sector distribution of a track after being formatted by a conventional formatting step.

In the embodiment, a high density floppy disk is taken as an example for introducing the invention. It is appreciated that the application of the invention is not restricted by a floppy disk only. The method provided by the invention may also be applied in other storage medium to retrieve the capacity reduced due defect or damaged part. Under a DOS/Window environment, a high density floppy disk comprises two sides. Each side comprises 80 tracks, while each track can formatted into 18 sectors. Each sector comprises 512 bytes, that is, the capacity is 512 bytes/sector. Therefore, a total capacity of a high density floppy disk is equal to 2(sides/disk)×80(tracks/side)×18(sectors/track)×0.5K (bytes/sector)=1440K (bytes/disk). After a further study and measurement, a sector distribution of a normal disk of which the track is formatted is shown in FIG. 1. After being formatted, the track 100 is partitioned into 22 sectors, sectors 101 to 122. The former eighteen sectors 101 to 118 are storage capacity sectors which allow normal data access, while the latter four sectors 119 to 122 are sectors which are reserved from being used.

While the Windows operation system is formatting a disk, as mentioned above, each of the tracks 100 is partitioned into 22 sectors 101 to 122. Each of the sectors 101 to 122 has an identity field for distinguishing from each, so as to distinguish any damaged sector from those normal ones. For example, the identity fields of the sectors 101 to 118 comprises ID1, ID2, . . . , ID18 arranged in a sequential order. The identity fields of the sectors 119 to 122 of the reserved capacity sectors are erased as "0". The identity fields of the sectors 119 to 122 thus can not be accessed. Therefore, when a disk is checked or a data access operation is performed on the disk, only the identity fields ID1 to ID18 of the sectors 101 to 118 can be observed, while the zero identity fields of the sectors 119 to 122 can not be read.

To effectively utilize the reserved capacity (320K byte), and to avoid the reduction of storage capacity of the disk due to the damaged sectors, or even the whole disk failure due to the damaged sectors being in a system area, a formatting program is provided in the invention. A damaged sector is marked with a flag and replaced by a reserved sector. Thus, the capacity of the damaged sector is retrieved.

Figure 2:
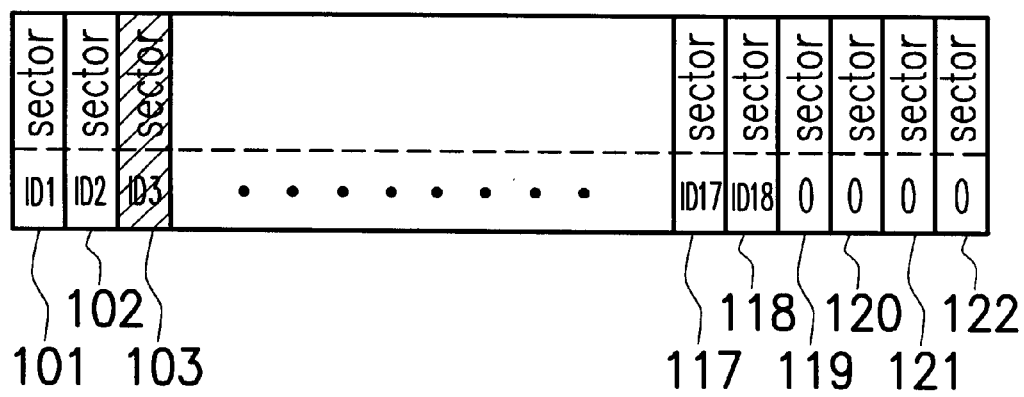
FIG. 2 is a schematic drawing of a sector distribution being scanned by a special formatting method according to a preferred embodiment of the invention.
Figure 3:
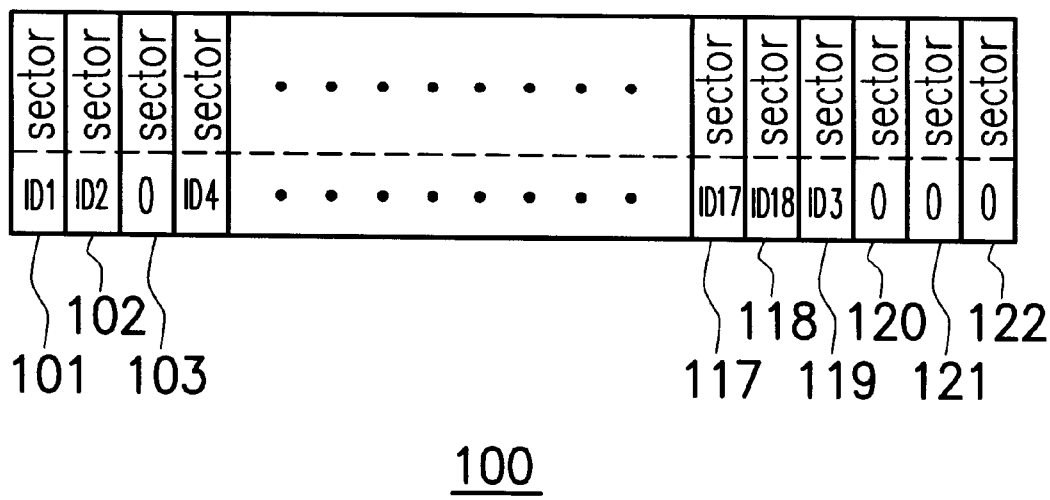
FIG. 3 is a schematic drawing of a sector distribution being rearranged by a special formatting method according to an embodiment of the invention.
Figure 4:
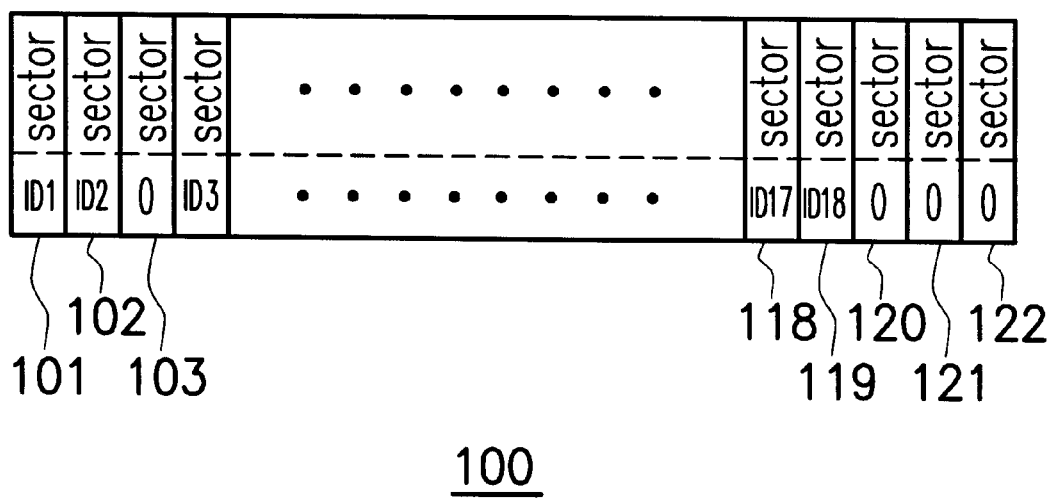
FIG. 4 is a schematic drawing of a sector distribution being rearranged by a special formatting method according to another embodiment of the invention.

Please refer to FIG. 1, FIG. 2, and FIG. 3. A sector distribution of sectors after being scanned is shown in FIG. 2, while a sector distribution of sectors after being formatted and rearranged is shown.

In FIG. 2, the sectors 101 to 122 of the track 100 are scanned by running a formatting program. A damaged sector, for example, the sector 103 is found damaged and recorded. Since the identity fields of the sectors 101 to 122 of the track 100 are output together with the program after the format command is given to the disk controlling interface, in the normal formatting process, the identity fields are continuous and sequential. For example, the sector 101 comprises an identity field ID1, the sector 102 comprises an identity field ID2 , and sector 118 comprises an identity field ID118, while the null identity fields are "0" for the sectors 119 to 122.

A null identity field is written into the identity field the damaged sector 103 to overwrite the identity field ID3. That is, the identity field of the damaged sector 103 is altered from ID3 to "0". Meanwhile, the previous identity field ID3 of the damaged sector 103 is written into a reserved capacity sector 119 to 122, for example, the sector 119. Therefore, the identity field of the sector 119 is altered from "0" to ID3. As shown in FIG. 3, the identity fields of the sectors 101 to 122 are rearranged as ID1, ID2, 0, ID4, . . . , ID18, ID3, 0, 0, 0. While an operation system is scanning the disk, it is found that there are 18 available sectors for data access, for example, 101, 102, 104, 105, . . . , 118, 119. The reserved capacity sectors are the sectors 103, 120, 121, and 122. Therefore, the available storage capacity is not reduced even when some of the sectors are damaged.

Apart from the above method for retrieving a storage capacity of a storage medium, a method to rearrange the output sequence of the identity fields of the sectors is also provided by the invention. In this embodiment, after being scanned, an null identity field is written into damaged sector 103 to overwrite the identity field ID3 into "0". Identity fields ID1, ID2, . . . , and ID 18 are then written into the sectors 101, 102, 104, . . . , and 119, while "0" is written into each of the sectors 119 to 122. Therefore, the sectors 101 to 122 have identity fields ID1, ID2, 0, ID4, . . . , ID17, ID18, 0, 0, 0, and 0, respectively. In this manner, it is found that the track 100 comprises eighteen sectors 101, 102, and 104 to 119 available for normal data access operation and four sectors 103, 120 to 122 reserved from being used for data access. For the whole disk, the capacity for data storage is remained as a disk without any defect.

From the above embodiments, the capacity of a storage medium can be optimized even when the disk is partly damaged. The storage medium is scanned to record an identity tag of a damaged sector. The identity tag of the damaged sector is overwritten with a null identity tag of a reserved capacity sector. The null identity tag of the reserved capacity sector is overwritten with the identity tag of the damaged sector. The optimization of the capacity of the storage medium is thus achieved by retrieving the capacity occupied by the reserved capacity sector.

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of retrieving a capacity occupied by a damaged sector of a storage medium, comprising:

scanning the storage medium to record an identity tag of the damaged sector;

overwriting the identity tag of the damaged sector with a null identity tag of a reserved capacity sector; and overwriting the null identity tag of the reserved capacity sector with the identity tag of damaged sector.

2. The method according to claim 1, wherein the storage medium comprises a floppy disk.

3. The method according to claim 2, wherein the storage medium comprises a high density floppy disk.

4. The method according to claim 3, wherein the high density floppy disk comprises two sides under DOS/WINDOWS environment.

5. The method according to claim 3, wherein the high density floppy disk comprises 1.44 M byte of storage capacity.

6. A method of retrieving a capacity of a damaged sector, comprising:

providing a storage medium comprising a storage capacity part and a reserved capacity part, wherein the storage capacity part comprises a plurality of primary sectors and the reserved capacity part comprises a plurality of secondary sectors, and each of the primary sectors has a corresponding identity field and each of the sectors has a "0" identity field;

scanning the primary sectors to find a damaged primary sector and to record a corresponding identity field of the damaged primary sector;

overwriting the corresponding identity field of the damaged primary sector with one of the "0" identity field of one of the secondary sectors;

overwriting the "0" identity field of the secondary sector with the corresponding identity field of the damaged sector; and rearranging an output sequence of the identity fields of the primary sectors.

7. The method according claim 6, wherein the storage capacity part comprises eighteen primary sectors for dada access.

8. The method according to claim 6, wherein the reserved capacity comprises four secondary sectors.

9. A method of retrieving a capacity of a damaged sector, comprising:

provinding a storage medium comprising a storage capacity part and a reserved capacity part, wherein the storage capacity part comprises a plurality of primary sectors and the reserved capacity part comprises a plurality of secondary sectors, and each of the primary sectors has a corresponding identity field and each of the sectors has a "0" identity field;

scanning the primary sectors to find a damaged primary sector and to record a corresponding identity field of the damaged primary sector;

writing a zero identity field to the damaged primary sector; and writing identity fields to the primary sectors and one of the secondary sector with the damaged sector being skipped, and writing a zero identity field to the rest of the secondary sectors.

* * * * *